UNITED STATES PATENT OFFICE

2,054,019

BASE FOR COATING COMPOSITIONS

Otto Jordan, Mannheim, and Leo Kollek and Hanns Ufer, Ludwigshafen-on-the-Rhine, Germany, assignors to I. G. Farbenindustrie Aktiengesellschaft, Frankfort-on-the-Main, Germany No Drawing. Application January 6, 1933, Serial No. 650,502. In Germany January 21, 1932

7 Claims. (Cl. 260—2)

The present invention relates to the production of valuable products from conversion products of drying or partially-drying oils.

We have found that products of great industrial value, suitable for example as bases for lacquers, varnishes, or impregnating compositions, that is, broadly, as bases for coating compositions, may be obtained by subjecting to a joint polymerization conversion products from at least partially drying vegetable oils and polymerizable oxygenated vinyl compounds, selected from the class consisting of ethers and ketones, i. e. ethers and ketones containing at least one vinyl group.

The aforesaid conversion products of at least partially drying, that is drying or half-drying, vegetable oils comprise such products which show ester or iodine values, or both, considerably different from those of the initial oils. They may be prepared from said oils, for example by esterification with alcohols other than glycerol and/or by heating in the presence or absence of air, or by leading through the said oils a current of air, if desired, in the presence of polymerization catalysts. The said conversion products are of the type of the so-called "boiled oils". The heating of the initial drying or half drying oils may be effected in an open or closed vessel at temperatures between about 150° and 300° C., preferably between about 250° and about 280° C., for about 6 to about 12 hours, for example from 6 to 8 hours while working in a closed vessel and from 10 to 12 hours while working in an open vessel. If the heating is effected in a closed vessel the air may be expelled therefrom before the reaction by means of an inert gas such as nitrogen or carbon dioxide. The conversion products may also be obtained by blowing the initial oils with air, said reaction being effected at temperatures between about 40° and 120° C., preferably between about 60° and about 80° C., for from 6 to 12 hours. As already stated the said blowing or heating may be effected in the presence of polymerization catalysts. These catalysts are generally added in an amount of 0.01 to 5, preferably of 0.1 to 2 per cent by weight of the initial oil.

The said polymerization catalysts comprise for example the so-called siccatives, that is cobalt, manganese or lead salts of long chain unsaturated carboyxlic acids, such as linoleic acid, resinic acids, naphthenic acids and oleic acid; the aluminium salts of these acids which form the siccatives may likewise be employed. Instead of employing the aforesaid salts, the corresponding metal oxides may be added to the oils in a corresponding amount. Other suitable polymerization catalysts comprise for example metal chlorides such as aluminium chloride, iron chloride, zinc chloride and tin tetrachloride. Boron fluoride and phosphorus oxychloride may likewise be employed. Since aluminium chloride, phosphorus oxychloride and boron fluoride are very strong polymerization catalysts cooling is generally necessary at the beginning of the reaction if one of these catalysts be employed. Inorganic and organic peroxides, such as barium peroxide, sodium perborate, persulphuric acid, benzoyl peroxide or acetyl peroxide, may likewise be employed as polymerization catalysts.

The aforesaid conversion products also comprise, as already stated, those which may be prepared by esterifying the fatty acids contained in said drying and half drying oils with alcohols other than glycerol. Said alcohols may be chosen from the aliphatic, hydroaromatic or aromatic series, and from phenols. Specific examples of suitable alcohols are normal- and iso- butyl alcohols, amyl alcohol, hexyl alcohol, heptyl alcohol, decyl alcohol, dodecyl alcohol, allyl alcohol, borneol, pulegol, benzyl alcohol, thymol, phenol and its homologues, such as the cresols, xylenols and naphthols. Polyhydric alcohols may likewise be employed, for example mono-, di- and tri-ethylene, butylene and propylene glycols, sorbitol, mannitol or pentaerythritol. Alkyl ethers of said polyhydric alcohols may likewise be employed for the esterification, provided at least one hydroxyl group of the alcohols is not etherified. Thus the methyl, ethyl, butyl, normal propyl and isopropyl ethers of the said polyhydric alcohols may be employed.

The aforesaid drying and half drying oils, from which the conversion products may be prepared, comprise for example linseed oil, perilla oil, castor oil, China-wood oil, poppy-seed oil, rapeseed oil, walnut oil, sunflower-seed oil, coconut oil, and like drying or half drying oils, mixtures thereof being also employed, if desired, for preparing the conversion products.

Instead of employing the aforesaid boiled oils, the conversion products obtainable by heating or boiling the products prepared by esterifying the acids contained in said oils with alcohols other than glycerol may likewise be used.

Fractions of the aforesaid conversion products may also be employed, which fractions have been previously freed from mucinous matter and non-polymerizable constituents by freezing out or by fractional precipitation by means of aliphatic alcohols containing up to 4 carbon atoms, such as methanol, ethanol, propanol or butanol. When carrying out the said fractional precipitation, the mucinous matter precipitates first when a small amount of the aforesaid alcohols is added, the non-polymerizable constituents being then precipitated by adding more alcohol, if desired after removing the precipitated mucinous matter by filtration, decantation or centrifuging. The products obtainable by esterifying the acids contained in the oils with alcohols other than glycerol may likewise be fractionated by one of the aforesaid methods, before they are polymerized together with the said vinyl compounds or before they are converted into the products of the type of boiled oils.

The said polymerizable oxygenated vinyl compounds comprise those which are in the monomeric state or are incompletely polymerized. Suitable compounds of this kind may be described as the acyclic and homocyclic ethers and the alkyl ketones which contain at least one vinyl group. These compounds are, for example, selected from the class consisting of the vinyl alkyl-, vinyl cyclo-alkyl-, and vinyl aryl-ethers and the vinyl alkyl ketones which contain at least one vinyl group, more specifically, for example, vinyl methyl-ether, vinyl ethyl ether, vinyl n-butyl ether, vinyl-isopropyl ether or vinyl cyclohexyl ethers, or divinyl ether, the vinyl aryl ethers, such as vinyl phenyl ether

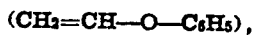
(CH₂=CH—O—C₆H₅), vinyl beta-naphthyl ether

(CH₂=CH—O—C₁₀H₇), para-vinyl anisol

(CH₂=CH—C₆H₄—O—CH₃)

or para-vinyl-phenetol

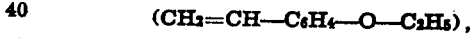
(CH₂=CH—C₆H₄—O—C₂H₅), or vinyl alkyl ketones, i. e. vinyl methyl ketone, vinyl ethyl ketone or vinyl isopropyl ketone.

Generally from 5 to 50 parts of the said vinyl compounds are employed for from 95 to 50 parts, respectively, of the aforesaid conversion products. If the vinyl compounds be employed in small quantities, such as of from about 5 to about 15 parts, for about 95 to about 85 parts, respectively, of the conversion products, interpolymerized products are obtained which have properties similar to, though improved over, those of the conversion products, that means products of the type of boiled oils are obtained which, however, dry much more quickly than the ordinary boiled oils and yield coatings on substrata of any kind, such as paper, cardboard, fabrics, wood, glass or metals, which coatings adhere much more strongly to the substrata than coatings prepared from ordinary boiled oils. If a large amount of the aforesaid vinyl compounds be employed, such as from about 15 to about 50 parts for from about 85 to about 50 parts, respectively, of the conversion products, products are obtained which differ by their elasticity and resistance to water from the corresponding vinyl compounds which have been polymerized alone and are superior thereto as regards the said properties. The interpolymerized products having the most valuable properties are obtained by the joint polymerization of about 25 parts by weight of said polymerizable oxygenated vinyl compounds and about 75 parts by weight of the said conversion products of said vegetable oils.

The joint polymerization may be carried out according to the most varying methods, for example by heating, by standing for several weeks at room temperature, by irradiation, for example with ultraviolet rays, by silent electric discharges. The heating is generally effected at temperatures between about 80° and about 250° C., preferably between about 100° and about 125° C., for from about 2 to about 30 hours.

Generally speaking, the employment of polymerization catalysts is preferable. The same catalysts which may be employed for the conversion of the initial drying and half drying oils may be used for carrying out the joint polymerization of the conversion products with the aforesaid vinyl compounds. All the catalysts enumerated before may accordingly be employed for the joint polymerization, as well as boric acid anhydride, anhydrous hydrofluoric acid, metal carbonyls and addition compounds of boron fluoride with aliphatic ethers of low molecular weight, such as ethyl ether, butyl ether or methyl ethyl ether, these polymerization catalysts being also suitable for the production of the aforesaid conversion products. The said catalysts are generally employed in an amount of about 0.001 to about 5 per cent, preferably of about 0.1 to about 2 per cent by weight, of the mixture of the conversion products with the said vinyl compounds. Insofar as the catalysts do not exert any undesirable action in the final product, they may remain therein. Metal salts, however, which may render turbid the coatings prepared from the interpolymerized products are preferably removed after the polymerization.

As already stated the polymerization is generally carried out by heating to temperatures between about 30° and about 250° C. The reaction may be started at a comparatively low temperature, such as between about 60° and 70° C., and after, say, 2 or 3 hours, the mixture is heated to a higher temperature, such as 100°, 125° or 150° C. for 6 or 7 hours. This kind of procedure is generally employed while employing very strong polymerization catalysts such as phosphorus oxychloride, aluminium chloride, boron fluoride or the addition products of this latter to aliphatic ethers. It is also possible, however, to carry out the whole reaction at a moderate temperature, such as from 60° to about 100° C., or the whole reaction may be carried out at high temperatures, such as those between about 125° and 250° C. Naturally, the time necessary for carrying out the polymerization may be shortened by working at the aforesaid high temperatures.

The products obtainable by the described joint polymerization apparently are "interpolymerized", that means the single components cannot be separated from each other. The products will accordingly be called "interpolymerized" in the claims.

The rapidity of drying and the hardness of the final products may be considerably increased by subsequent heating of the interpolymerized products to high temperatures, such as between about 200° and about 250° C., and even up to 300° C., for about half an hour up to about 5 hours, the coatings obtainable from the interpolymerized products treated in this manner being distinguished by an extreme rapidity of drying, a very high gloss and hardness.

The polymerization may be carried out in a closed vessel, if desired, after expelling the air therefrom by means of an inert gas such as nitrogen or carbon dioxide. The reaction may, however, also be effected in an open vessel, provided if desired with a rising tube or a reflux condenser, which connects the vessel with the open air. The polymerization may be carried out in the presence of inert organic solvents and/or diluents. The said solvents and diluents comprise for example aromatic and aliphatic hydrocarbons, such as benzene, toluene, mixtures of benzene with a fraction of gasoline boiling between about 120° and 180° C., tetrahydronaphthalene, and halogenated hydrocarbons, such as methylene chloride, ethylene chloride, chlorobenzene and chlorotoluene. The said solvents are usually employed in an amount of from about 10 to about 50 per cent by weight of the mixture. The advantage of the employment of such solvents consists in the possibility of effecting a very uniform polymerization, any local superheating being thus avoided. Moreover, if the interpolymerized products are to be employed as varnishes, the solvents may remain therein.

It is also possible to carry out the polymerization until products are obtained which are insoluble or difficultly soluble and sometimes capable of being molded.

If desired, the polymerization may be carried out in the presence of inert filling materials such as slate meal, quartz powder, kieselguhr, ground asbestos, cork meal or wood meal, or of inorganic pigments such as colcothar, white lead, lead chromate, titanium white or chromium oxides, products being thus obtained which are suitable for example for the preparation of coverings for floors, roofs and the like.

The following examples will further illustrate how this invention may be carried out in practice, but the invention is not restricted thereto. The parts are by weight.

Example 1

Boiled linseed oil, obtained by heating linseed oil in the absence of air for about 4 hours to from 290° to 300°C., is dissolved in 3 times its weight of normal-butyl alcohol by warming at from 70° to 80° C. The solution is then cooled down energetically, the polymerized fraction of the boiled oil thus separating at the bottom of the vessel as a viscous liquid. The supernatant alcoholic solution is decanted and the remaining viscous liquid is freed as completely as possible from butyl alcohol by heating to from 40° to 60° C. in vacuo. The polymerized fraction thus obtained forms a very viscous, limpid liquid showing a slightly yellow colour. It is obtained in an amount of about 70 per cent by weight of the initial boiled linseed oil.

480 parts of the viscous fraction thus obtained are mixed with 72 parts of vinyl ethyl ether. The mixture is then polymerized by heating at from 30° to 60° C. for about 6 hours, while stirring and refluxing in the presence of 10 parts of a 2 per cent solution in dibutyl ether of the addition product of boron fluoride to di-n-butyl ether. The polymerization is finished as soon as no evolution of heat occurs when a further amount of said addition product of boron fluoride is added to a sample of the reaction product. The interpolymerized product obtained is a very viscous, limpid liquid, which shows a slightly yellowish colour and properties similar to those of the boiled linseed oil, the rapidity of drying and resistance to water being, however, considerably increased.

According to the purpose in view, the amount of the vinyl ethyl ether may be considerably increased, interpolymerized products being thus obtained which yield harder coatings. Similarly, vinyl butyl ether, vinyl cyclohexyl ether or like vinyl ethers may be employed.

Similar products are obtained which have only slightly different properties, by carrying out the polymerization in the presence of 10 parts of crystallized zinc chloride or, while heating to from about 50° to about 60° C. for about 5 hours, after the addition of about 10 parts of benzoyl peroxide or of other peroxides, instead of the said addition product of boron fluoride.

Example 2

900 parts of the viscous fraction of a boiled China-wood oil, which fraction has been separated by means of butyl alcohol from a boiled China-wood oil obtained by blowing China-wood oil with air at about 80° C. for about 8 hours, are mixed with 480 parts of vinyl n-butyl ether and filled into a stirring vessel provided with a cooling jacket and a reflux condenser. The mixture is then heated to from 50 to 60° C., 10 parts of a 2 per cent solution in dibutyl ether of the addition product of boron fluoride to dibutyl ether being then added. The polymerization begins, as may be ascertained by the evolution of heat. The temperature is kept between 50° and 60° C. by cooling. Substantial increases of temperature must be avoided since they result in dark reaction products. As soon as the temperature remains constant without necessitating further cooling, further 10 parts of the addition product of boron fluoride are added, the polymerization being carried out in this way until no more evolution of heat occurs.

A large amount of boron fluoride should not be added as a single portion, since in this case dark products are generally obtained.

Further amounts of the China-wood oil and vinyl-n-butyl ether mixture may be polymerized by allowing them slowly to flow into the stirring vessel, together with a corresponding amount of the solution of the boron fluoride addition product.

The resulting interpolymerized product is a very viscous, limpid liquid, showing a slightly yellowish colour, which has similar properties as boiled China-wood oil, but yields coatings on wood, metal or glass surfaces which are much more resistant to water than those prepared from the boiled China-wood oil.

What we claim is:—

1. Bases for coating compositions, essentially comprising an interpolymerized product from a conversion product of an at least partially drying vegetable oil and a polymerizable vinyl compound selected from the class consisting of the acyclic and homocyclic ethers and the alkyl ketones, containing at least one vinyl group.

2. Bases for coating compositions, essentially comprising an interpolymerized product from a conversion product of a drying vegetable oil and a polymerizable vinyl compound selected from the class consisting of the acyclic and homocyclic ethers and the alkyl ketones, containing at least one vinyl group.

3. Bases for coating compositions, essentially comprising an interpolymerized product from a boiled, at least partially drying vegetable oil and a polymerizable vinyl compound selected from the class consisting of the acyclic and homocyclic ethers and the alkyl ketones, containing at least one vinyl group.

4. Bases for coating compositions, essentially comprising an interpolymerized product from 95 to 50 parts by weight of a conversion product of an at least partially drying vegetable oil and from 5 to 50 parts by weight, respectively, of a polymerizable vinyl compound selected from the class consisting of the acyclic and homocyclic ethers and the alkyl ketones, containing at least one vinyl group.

5. Bases for coating compositions, essentially comprising an interpolymerized product from 95 to 50 parts by weight of a boiled, drying vegetable oil and from 5 to 50 parts by weight, respectively, of a polymerizable vinyl compound selected from the class consisting of the acyclic and homocyclic ethers and the alkyl ketones, containing at least one vinyl group.

6. Bases for coating compositions, essentially comprising an interpolymerized product from about 75 parts by weight of boiled linseed oil and about 25 parts by weight of a vinyl ether.

7. Bases for coating compositions, essentially comprising an interpolymerized product from about 75 parts by weight of boiled linseed oil and from about 25 parts by weight of vinyl ethyl ether.

OTTO JORDAN.
LEO KOLLEK.
HANNS UFER.